(12) United States Patent
Lewicki

(10) Patent No.: US 10,898,973 B2
(45) Date of Patent: Jan. 26, 2021

(54) METHOD AND SYSTEM FOR ENGRAVING, MARKING AND LABELLING A WORKPIECE USING A LASER PLOTTER

(71) Applicant: Trotec Laser GmbH, Wels (AT)

(72) Inventor: Gerhard Lewicki, Waizenkirchen (AT)

(73) Assignee: Trotec Laser GmbH

( * ) Notice: Subject to any disclaimer, the term of this patent is extended or adjusted under 35 U.S.C. 154(b) by 283 days.

(21) Appl. No.: 15/573,016

(22) PCT Filed: May 9, 2016

(86) PCT No.: PCT/AT2016/050132
§ 371 (c)(1),
(2) Date: Nov. 9, 2017

(87) PCT Pub. No.: WO2016/179621
PCT Pub. Date: Nov. 17, 2016

(65) Prior Publication Data
US 2018/0193946 A1    Jul. 12, 2018

(30) Foreign Application Priority Data
May 13, 2015 (AT) .............................. A 50402/2015

(51) Int. Cl.
*B23K 26/361* (2014.01)
*B23K 26/04* (2014.01)
(Continued)

(52) U.S. Cl.
CPC .......... *B23K 26/361* (2015.10); *B23K 26/048* (2013.01); *B23K 26/0643* (2013.01);
(Continued)

(58) Field of Classification Search
CPC .. B23K 26/361; B23K 26/354; B23K 26/048; B23K 26/0643; B23K 26/0648; B23K 26/083; B23K 26/0869
(Continued)

(56) References Cited

U.S. PATENT DOCUMENTS 6,531,682 B1    3/2003  Guttler
9,815,143 B2 *  11/2017 Fazeny .................. B26D 5/007
(Continued)

FOREIGN PATENT DOCUMENTS

AT            512092 A1    5/2013
CN         201456866 U     5/2010
(Continued)

OTHER PUBLICATIONS

International Search Report for Application No. PCT/AT2016/050132, dated Oct. 12, 2016, pp. 1-3.

*Primary Examiner* — Benjamin R Shaw
(74) *Attorney, Agent, or Firm* — Lerner, David, Littenberg, Krumholz & Mentlik, LLP

(57) ABSTRACT

The invention relates to a method for engraving, marking and/or labelling a workpiece using a laser plotter, as well as a laser plotter in which at least one beam source in the form of a laser is provided in a housing of the laser plotter, into which the item to be machined is inserted. The workpiece is placed on a processing table, and a laser beam emitted by the beam source is sent via deflecting elements to at least one focusing unit, from which the laser beam is deflected in the direction of the workpiece and is focused for the processing. The control, in particular the position control of the laser beam to the workpiece, takes place via a software running on a control unit, so that the workpiece is processed line by line by movement of a sliding carriage. Preferably on an external component, in particular a computer or a control unit, a graphic and/or a text is created, which is transmitted to the (Continued)

Figure 1:
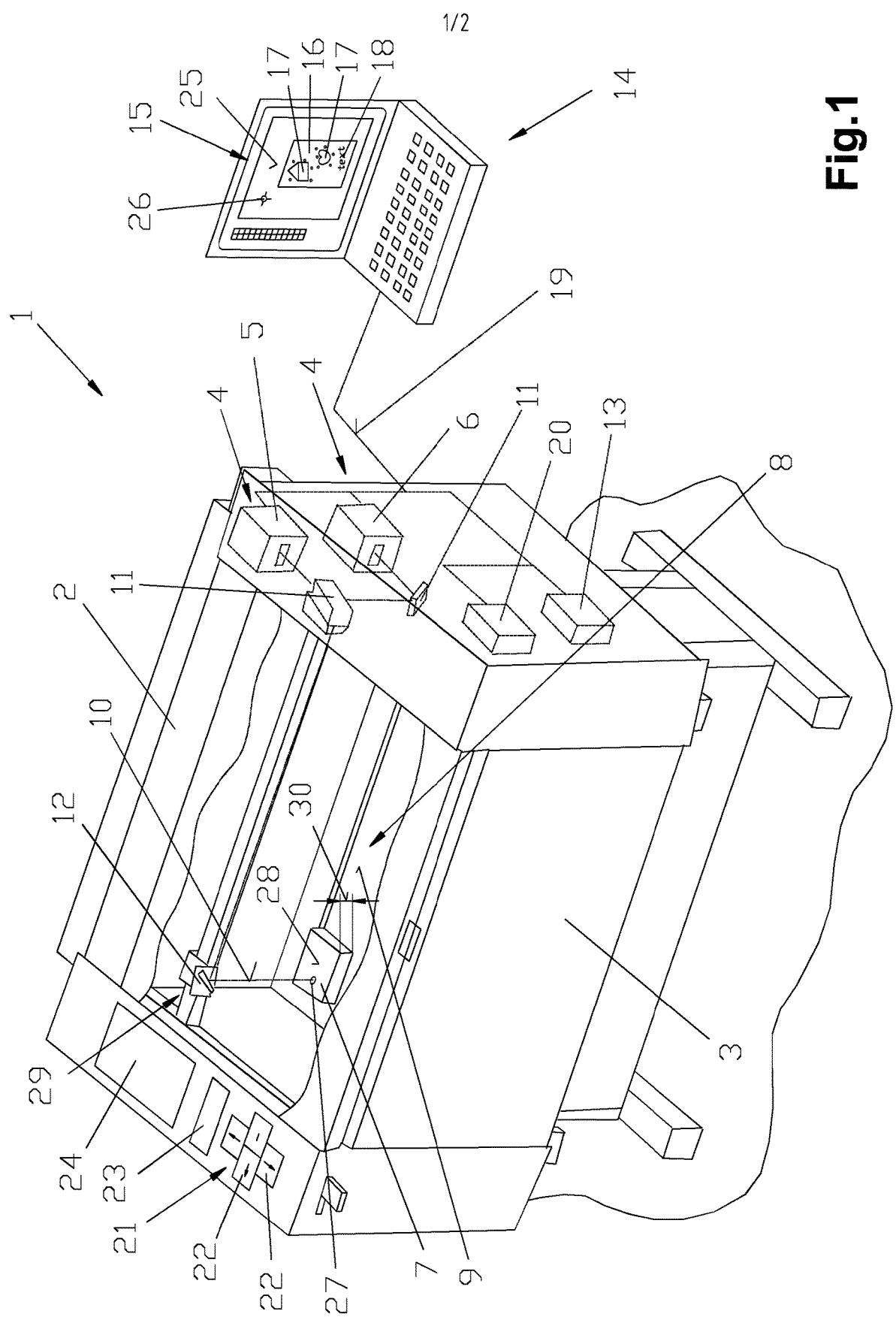

control unit of the laser plotter, which performs a conversion of the transmitted data, in particular the graphic and/or the text, for controlling the individual elements of the laser plotter. A laser pointer of the laser is positioned on or in the area of the workpiece after insertion of the workpiece into the working area, whereupon after activation of the machining process or a focusing process preferably a position correction is performed. Subsequently, a distance measurement to a surface of the workpiece is performed, and the data acquired are transferred to the control unit, which then calculates a position of the working table for the optimum focal point of the laser, taking into account predetermined parameters, in particular the replaceable laser lens used, and subsequently the processing table is shifted.

8 Claims, 2 Drawing Sheets

(51) Int. Cl.
  *B23K 26/06* (2014.01)
  *B23K 26/08* (2014.01)
  *B23K 26/354* (2014.01)
(52) U.S. Cl.
  CPC ........ *B23K 26/0648* (2013.01); *B23K 26/083* (2013.01); *B23K 26/0869* (2013.01); *B23K 26/354* (2015.10)

(58) Field of Classification Search
  USPC ............................................ 219/720, 121.72
  See application file for complete search history.

(56) References Cited

U.S. PATENT DOCUMENTS

| | | | |
|---|---|---|---|
| 2002/0190230 A1* | 12/2002 | Dworkowski | B23K 26/048 250/559.38 |
| 2005/0205537 A1 | 9/2005 | Penz et al. | |
| 2009/0057284 A1* | 3/2009 | Fukuda | B23K 26/0608 219/121.72 |
| 2012/0052605 A1* | 3/2012 | Jang | B23K 26/048 438/16 |
| 2013/0114114 A1* | 5/2013 | Fazeny | B23K 26/361 358/3.29 |
| 2014/0054274 A1* | 2/2014 | Chagnot | B23K 26/36 219/121.72 |
| 2017/0361400 A1* | 12/2017 | Hagenlocher | B23K 26/048 |
| 2018/0076060 A1* | 3/2018 | Oh | H01L 21/67248 |

FOREIGN PATENT DOCUMENTS

| | | |
|---|---|---|
| DE | 102008063037 A1 | 7/2010 |
| EP | 1577048 A1 | 9/2005 |
| WO | 1999038643 A1 | 8/1999 |

* cited by examiner

METHOD AND SYSTEM FOR ENGRAVING, MARKING AND LABELLING A WORKPIECE USING A LASER PLOTTER

CROSS-REFERENCE TO RELATED APPLICATION

This application is a national phase entry under 35 U.S.C. § 371 of International Application No. PCT/AT2016/050132, filed May 9, 2016, which claims priority to Austrian Patent Application No. A-50402/2015, filed May 13, 2015, the disclosures of which are incorporated herein by reference.

The invention relates to a method for engraving, marking and/or labelling a workpiece using a laser plotter, and a laser plotter as described herein.

In laser plotters, the laser light is focused sharply with a focusing lens. Thus, in the focus of the laser beam an extremely high power density is produced, with which materials can be melted or evaporated, engraved, or marked. In order to produce this focus, according to the general prior art a wide variety of methods have been used in laser plotters:

Manual Focusing:

The height-adjustable processing table of the laser plotter is raised or lowered (Z axis), preferably by two keys. The focus position is determined visually using a so-called "focusing tool" (distance gauge). Each focal length and thus each lens needs its own focusing tool. Usually, lenses with a plurality of focal lengths, namely 1.5; 2; 2.5; 2.85; 3.2; 4 and 5 inches, are available. The drawback of such a manual shifting is that it allows a very high degree of inaccuracy in operation, since the user manually adjusts the height and thus often does not stop the processing table in time. As a result, the quality of an engraving is strongly impaired, since the focused laser beam is not optimally adjusted to the surface of the workpiece.

Automatic Focusing Via Software:

Here, a program is started in the computer that supplies data to the laser plotter. However, it is necessary for the user to know the thickness of the workpiece and to enter it correctly into the software, so that the thickness of the material to be processed can be stored. Furthermore, the user must select the correct lens. When the "automatic software focusing" function is selected on the computer, before each laser processing the correct position of the processing table (Z axis) is calculated from material thickness, focal length and previous table (Z) position, and corrected accordingly. Here a major drawback is that the user has to make error correction entries or know exactly which components are used and how thick the workpiece to be processed is, respectively.

Automatic Focusing with Light Barrier:

Here, in the working area of the laser plotter there is a light barrier, which is preferably spaced about 40 mm at the Y position. This light barrier measures over the entire processing table. After the workpiece has been inserted, the user can start automatic focusing on material thickness directly at the machine keyboard. This so-called "hardware autofocus" is triggered by preferably simultaneous pressing of the keys Z-up and Z-down. The machine control then detects whether the processing table has to be raised or lowered in order to move the material surface to the level of the light barrier. The disadvantage here is that focusing is possible only onto a specific point, preferably only at the position Y=40 mm. A further drawback is that materials that are thinner than the laterally applied Y ruler (stop; 2 mm) cannot be focused onto, which is the case for cutting of paper, cloth, and the like. Moreover, the light barrier is suitable only for a single focal length, so that upon exchange of the lens the user would have to make a correction via the machine control.

The objective of the invention is to provide a method and a laser plotter in which maximally straightforward focusing on an inserted workpiece is possible. It should also be possible for the workpiece to be positioned to any desired position in the working area of the laser plotter. A further objective is to avoid the aforementioned disadvantages.

The objective of the invention is achieved by a method for engraving, marking and/or labelling a workpiece ( ) using a laser plotter in which a laser pointer of the laser is positioned on or in the area of the workpiece after the workpiece has been inserted into the working area, whereupon a position correction is preferably carried out after activation of the machining process or focusing process, and a distance measurement is then performed on the surface of the workpiece, and the data acquired are transferred to the control unit, which subsequently calculates a position of the processing table for the optimum focal point of the laser, taking into account predetermined parameters, in particular of the replaceable laser lens used, and then the processing table is shifted. Here it is advantageous that the workpiece can thereby be inserted into any position in the working area, where the user makes a rough position determination via the laser pointer, and thus a simple distance measurement can then be performed on the inserted workpiece. This makes it possible also to insert uneven, curved and stepped workpieces can be used, since the user can determine the focal point via the laser pointer. With the distance measurement used, it is advantageously achieved that the surface of the workpiece is thus detected, so that corresponding distances can be determined, where it is also possible for a corresponding surface profile to be produced, which is displayed to the user on the monitor. As a matter of principle, it is also possible to adjust the focus, in particular the processing table, by knowing the surface course during the machining process, so that at every specific workpiece height the optimum focusing is always given.

One advantageous procedure comprises performing a continuous distance measurement during the shifting of the processing table. This allows the processing table to be optimally aligned with the surface of the workpiece. It is, of course, also possible for a shifting of the processing table to be carried out without the distance measurement, as the position of the processing table has been determined beforehand.

Another advantageous embodiment is a procedure in which after the activation of the machining operation the focusing unit is shifted by a definable correction factor so that the distance measurement takes place at the position of the laser pointer. This achieves a straightforward design of the focusing unit, because the distance measurement device can be installed outside the laser pointer and the laser optics, but the distance is measured precisely at the position of the laser pointer. The user thus does not need to make any corrections; hence, user-friendliness is increased. In this case, it is also possible that upon exchange of the focusing unit with the distance measurement device, in the case of a different position of the distance measurement device only a new correction value need to be entered.

A procedure in which the distance measurement is performed by ultrasound is advantageous. The surface of a wide variety of materials can thus be reliably detected. At the same time, inexpensive use of already known ultrasonic distance measurements from other fields is possible, since the attachment to the focusing unit can be effected in any way. At the same time, it is not necessary for the user to be able to precisely adjust the position, as a larger area is covered by the ultrasonic measurement, and the highest point of the workpiece can nevertheless be determined.

One advantageous procedure comprises shifting of the focusing unit of the laser plotter according to a pre-selectable movement path during the distance measurement. As a result, a larger area can be detected, so that positioning via the laser pointer does not have to be precise. A further advantage is that in this manner minor differences in height, which the user possibly cannot detect with the naked eye, can be determined during alignment with the highest point of the workpiece. If sufficient time is available, it is also possible that the user starts only a focusing process, and then the entire working area is detected by the ultrasonic sensor, so that no pre-selection of the position is necessary.

One advantageous procedure is that the processing table and the focusing unit, in particular the laser pointer, are adjusted to confirm the position before the start of the machining process. Thus, the position determined is indicated to the user via the laser pointer, whereupon the position can be confirmed or corrected. Here it is also possible that after elapse of a certain time, for example 5 seconds, the processing operation is started without confirmation by the user. It is, of course, possible that this option of displaying the determined position can be deactivated in the software of the laser plotter.

One advantageous procedure comprises performing a position detection of the workpiece based on the data acquired. This allows the user to insert the workpiece arbitrarily, which considerably increases user-friendliness.

Another advantageous embodiment is a procedure in which a plurality of parameters of the machining process are combined with the data of the distance measurement for determining the focus. This allows optimal adaptation to a wide variety of components.

Furthermore, the objective of the invention is achieved by means of a laser plotter in which a distance measurement device is provided in the area of the focusing unit, and this is connected to the control unit for transmitting the ascertained data, in particular the height or distance of the inserted workpiece.

It is advantageous in this case that the focus of the laser is adjusted not to the processing table but directly to the height of the workpiece. As a result, the laser quality can be significantly improved. A further significant advantage is that with the system used, in particular an ultrasonic distance measurement, the positioning does not have to be performed precisely, since the distance measuring system covers a larger area, as a result of which user-friendliness is improved.

An embodiment in which the distance measurement device is formed by an ultrasonic sensor is advantageous. As a result, it is possible to use inexpensive systems already known from the prior art, which are attached in the area of the focusing unit.

In an advantageous embodiment, a position correction value for the distance measurement device is stored in the laser plotter, in particular in a control unit. As a result, any arbitrary distance measurement device of any size can be used, since the focusing unit and thus the distance measurement device are correspondingly moved for the distance measurement.

Finally, in an advantageous embodiment a plurality of distance measurement devices, in particular ultrasonic sensors, are provided on the focusing unit. Thus, the quality of the distance measurement can be increased, because for differing materials the corresponding distance measuring unit can be selected.

The invention is described hereinafter in the form of exemplary embodiments, wherein attention is drawn to the fact that the invention is not limited to the exemplary embodiments or solutions represented and described.

Figure 2:
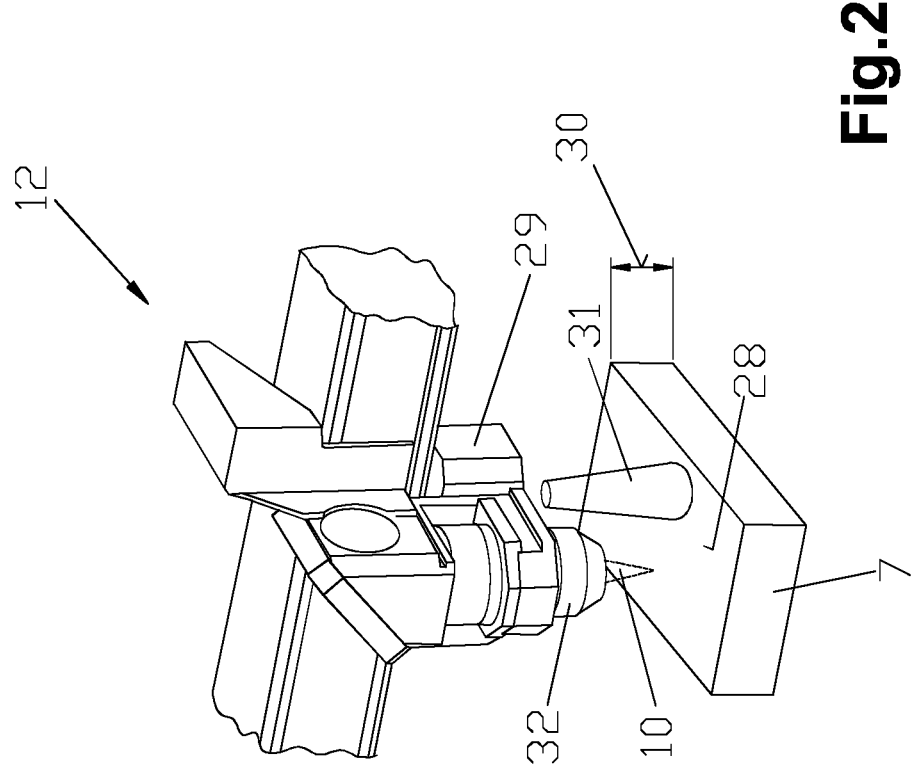

The figures show:

FIG. 1 a schematic illustration of a device using a laser plotter and display element connected to it;

FIG. 2 is a schematic illustration of the focusing unit with the distance measurement device provided thereon, in a simplified, schematic representation.

It should be stated by way of introduction that, in the individual embodiments, the same parts are provided with the same reference numbers or same component designations, wherein the disclosures contained in the entire description can, by analogy, be transferred to same parts with same reference numbers or same component designations. The position details selected in the description, such as, e.g., top, bottom, lateral, etc., relate to the figure described, and in the event of a change of position, they are to be transferred to the new position by analogy. Individual features or feature combinations from the exemplary embodiments shown and described may also represent independent inventive solutions.

FIG. 1 schematically shows a processing device 1, in particular a laser plotter 2, also referred to as a laser engraver, where at least one, and in particular two, beam source or sources 4 in the form of lasers 5, 6 is/are provided and operated in a housing 3. The lasers 5 and 6 act, preferably in alternating fashion, on the workpiece to be processed 7, wherein the workpiece 7 is positioned in a working area 8 of the laser plotter 2, in particular on a processing table 9. A laser beam 10 emitted from the beam source 4 is sent via deflection elements 11 to at least one movable focusing unit 12, from which the laser beam 10 is deflected in the direction of the workpiece 7, and is focused for the processing. The control, in particular the position control of the laser beam 10 to the workpiece 7, takes place by means of software running on a control unit 13, wherein, at an external component 14, in particular at a display element 15 in the form of a computer 15 or a control device, a processing job 16 with a graphic 17 and/or a text 18 is prepared and/or loaded, which is transferred to the control unit 13 of the laser plotter 2 via a data connection 19, which, from a stored database 20, carries out a conversion of the transferred data, in particular of the processing job 16 with the graphic 17 and/or of the text 18, for controlling the individual elements of the laser plotter 2.

The laser plotter 2 further comprises input means 21, in particular direction keys 22, for moving and positioning the focusing unit 12 and thus the laser beam 10. In this situation, it is possible for further additional input buttons 21 to be provided, for example in the form of a confirmation button 23 or the like. It is also possible for a display monitor 24 to be provided at the processing device 1, at which, for example, the same functions and displays are represented which correspond to the display element 15. This display monitor 24 can be designed as a touch monitor 24, so that by touch the user can carry out control or make inputs, or carry this out by way of the input means 21.

No more detailed description of the mechanical arrangement of such a laser plotter 2 will be provided, since this is already known from the prior art, in particular from the Applicants' WO 1999/038643 A, and can be taken from this.

It is of course also possible to make use of an arrangement from other laser plotters 2 known from the prior art. In order to increase user-friendliness, on the display monitor 24 a working area 25 is represented showing the display element 15 or the laser plotter 2, with a laser position 26 corresponding to the working area 8 of the laser plotter 2 and the position of the laser beam 10 of the lasers 5,6 and the focusing unit, 12 respectively, which is rendered visible by a conventional laser-pointer 27 in the working area 8.

According to the present invention, now the user-friendliness with respect to the focusing of the laser plotter 2 is increased by a so-called semi-automatic adjustment of the focus for the laser or lasers 5,6, i.e., the user must first perform a rough positioning, in particular a rough positioning via the laser pointer 27, whereupon an automatic distance measurement to the surface 28 of the workpiece 7 takes place. For this purpose, a distance measurement device 29 is provided in the area of the focusing unit 12, connected to the control unit 13 for transmitting the data acquired, in particular a height 30 of the inserted workpiece 7. Thus, it is possible for the laser pointer 27 of the laser 5,6 to be positioned on or in the area of the workpiece 7 after the workpiece 7 has been inserted into the processing region 8, whereupon after activation of the machining process or a focusing process a distance measurement 31, as shown schematically in FIG. 2, is carried out on the surface 28 of the workpiece 7, and the data acquired are transferred to the control unit 13, which then calculates a position of the processing table 9 for the optimum focal point of the laser 5,6, taking into account predetermined parameters, in particular of the replaceable laser lens 32 used, and then the processing table 9 is shifted.

Here, in the laser plotter 2, in particular in the storage unit 13, for each of the various insertable laser lenses 32 a corresponding parameter "Laser lens or lens 1.5; Laser lens or lens 2; Laser lens or lens 2.5; Laser lens or lens 2.85; Laser lens or lens 3.2; Laser lens or lens 4; and Laser lens or lens 5" is stored, so that in the interplay with the data acquired from the distance measurement device 29, in particular the height 30 of the workpiece 7, an appropriate position for the processing table 9 is determined and set. Here, the distance measurement device 29 is formed by an ultrasound sensor which is suitable for detecting all materials or material alloys or material mixtures to be processed, in particular glass, aluminium, steel, wood, plastic, fabrics or the like, that can also be processed by the laser 5,6, i.e. the ultrasonic sensor is matched to the area of application of the laser 5,6.

After a distance measurement 32 has been carried out, the data acquired are transferred from the distance measurement device 29 to the control unit 13, which subsequently calculates the corresponding focal point. When this is completed, the processing table 9 is correspondingly shifted when a machining process is started. In this case, a continuous distance measurement 32 is carried out by the distance measurement device 29 preferably during the shifting of the processing table 9, so that any necessary corrections can still be made. This is advantageous in that if the processing table 9 is positioned very far away from the distance measurement device 29 and the workpiece 7 is of only very low height 30, the measuring result is not very precise, as the measuring range is increased and inaccurate. If, however, the processing table 9 is subsequently moved and approaches the distance measurement device 29, the accuracy is increased. Thus, by means of a continuous distance measurement 32 during the positioning, corresponding corrections can still be made, so that optimum adjustment of the processing table 9 is achieved.

In the exemplary embodiment shown, additionally a correction of the focusing unit 12, in particular of the distance measuring unit 29, is carried out in order to increase the accuracy for the distance measurement 32, i.e. after the activation of the processing operation or a focusing operation, the focusing unit 12 is moved by a definable correction factor stored in the laser plotter 2, in particular in the control unit 13, so that the distance measurement takes place at the position of the laser pointer 27, so that exactly that position which the user has selected via the laser pointer 27 is measured, i.e. the correction value corresponds to the compensation of the positions of the laser pointer 27 to the distance measurement device 29.

Furthermore, it is also possible that, during the distance measurement 32, the focusing unit 12 of the laser plotter 2 is moved in accordance with a pre-selectable movement path, i.e. with the distance measurement 32 being active, the focusing unit 12 with the distance measurement device 29 attached thereto is shifted, so that a larger range for the distance measurement 32 is covered. Such a procedure can be activated or deactivated, respectively, by the user in the software running on the control unit 13, so that e.g. in the case of large workpieces 7 this is activated in order to determine the entire workpiece 7, in particular the surface 30 of the workpiece 7.

Apart from that, it is possible that a position detection of the workpiece 7 is carried out on the basis of the data acquired from the distance measurement device 29 or from the control unit 13, since by the use of ultrasound the diverse contours of the workpiece 7 are detected, and these are subsequently evaluated via the software, i.e. it can be determined by the software how the workpiece 7 has been inserted into the working area 8, so that the machining process can be adjusted accordingly.

Use of ultrasonic sensors also allows a distance measurement 32 to be performed during the machining process, since the ultrasound has no influence on the laser beam 10. Neither does the smoke produced by the laser beam 10 during the machining processes affect the measurement result of the ultrasonic sensor. Particularly in the case of large workpieces 7 which have many and preferably large differences in height, it is advantageous if the focal point is corrected during operation, or the processing table 9 is shifted accordingly during the process, respectively.

It is, of course, also possible that a further or a plurality of ultrasonic sensors for distance measurement 32 is provided on the focusing unit 12, where corresponding correction values are stored for the individual ultrasonic sensors. The advantage of such a solution is that the various ultrasonic sensors are used for a wide variety of materials. Here it is possible that the corresponding material is selected in the software so that the matching ultrasonic sensor is then activated for the measurement, or that all ultrasonic sensors perform measurements simultaneously, and the best signal or the best data are transmitted.

As a matter of form, it should finally be emphasised that, for the better understanding of the structure of the system 1 and its components and their constituent parts, the same have in part been represented not to scale and/or enlarged and/or reduced in size.

In addition, individual features or feature combinations from the various exemplary embodiments shown and described can inherently form independent inventive solutions or solutions according to the present invention.

The invention claimed is:

1. A method for engraving, marking and/or lettering a workpiece using a laser plotter, in which a workpiece to be processed by at least one laser is inserted in a housing of the laser plotter, wherein the workpiece is placed on a processing table, and a laser beam emitted by the at least one laser is transmitted via deflecting elements to at least one focusing unit, by which the laser beam is deflected in the direction of the workpiece and focused for processing, wherein position control of the laser beam in relation to the workpiece is effected by software running on a control unit, so that the workpiece is processed line by line by movement of a sliding carriage, wherein a graphic and/or a text is created on a computer or a control device, the graphic being transferred to the control unit of the laser plotter, which performs a conversion of the graphic and/or the text, for controlling the individual elements of the laser plotter, whereby a distance measurement is performed in the area of the at least one focusing unit during the machining process, and after insertion of the workpiece into the machining area, a laser pointer of the at least one laser is positioned on or in the area of the workpiece, whereupon after activation of the machining process or a focusing process a distance measurement to a surface of the workpiece is carried out and data is acquired thereby are transferred to the control unit which then performs a calculation of a position of the machining table for the optimal focal point of the laser taking into account predetermined parameters, and the processing table is then shifted, characterized in that between the steps of activation of the machining process or the focusing process and the distance measurement, a position correction of the focusing unit is carried out, whereby a correction value used for this purpose corresponds to a compensation of the position of the laser pointer relative to the distance measuring device.

2. The method according to claim 1, wherein a continuous distance measurement is carried out during the shifting of the processing table.

3. The method according to claim 1, wherein after the activation of the machining operation or the focusing process the focusing unit is shifted by a definable correction factor, so that the distance measurement takes place at the position of the laser pointer.

4. The method according to claim 1, wherein the distance measurement is performed by ultrasound.

5. The method according to claim 1, wherein during the distance measurement the focusing unit of the laser plotter is shifted according to a pre-selectable movement path.

6. The method according to claim 1, wherein the processing table and the focusing unit, in particular the laser pointer, are adjusted to confirm the position before starting the machining process.

7. The method according to claim 1, wherein a position detection of the workpiece is carried out based on the data acquired during the distance measurement.

8. The method according to claim 1, wherein the predetermined parameters are combined with the data acquired during the distance measurement.

* * * * *